United States Patent [19]

Hedrick et al.

[11] E Re. 30,371

[45] Reissued Aug. 12, 1980

[54] CATALYTIC PROCESS FOR IMIDE-ALCOHOL CONDENSATION

[75] Inventors: Ross M. Hedrick, Creve Coeur; James D. Gabbert, St. Louis, both of Mo.

[73] Assignee: Monsanto Company, St. Louis, Mo.

[21] Appl. No.: 17,745

[22] Filed: Mar. 5, 1979

Related U.S. Patent Documents

Reissue of:

[64] Patent No.: 3,922,254
Issued: Nov. 25, 1975
Appl. No.: 490,439
Filed: Jul. 22, 1974

[51] Int. Cl.[2] ..... C08G 69/16

[52] U.S. Cl. ..... 528/312; 525/419; 528/317; 528/322; 528/323

[58] Field of Search ..... 528/312, 322–323, 528/317; 525/419

[56] References Cited

U.S. PATENT DOCUMENTS

| | | | |
|---|---|---|---|
| 2,682,526 | 6/1954 | Flory | 528/289 |
| 3,366,608 | 1/1968 | Lincoln et al. | 528/315 |
| 3,526,604 | 9/1970 | Wadsworth | 526/177 |
| 3,631,006 | 12/1971 | Hawkins | 526/177 |
| 3,660,356 | 5/1972 | Radlmann et al. | 528/292 |
| 3,740,379 | 6/1973 | Sebenda et al. | 528/319 |
| 3,772,253 | 11/1973 | Brassat | 528/317 |
| 3,909,498 | 9/1975 | Wolvers | 528/317 |

FOREIGN PATENT DOCUMENTS

| | | | |
|---|---|---|---|
| 1437020 | 6/1965 | France | 528/315 |

*Primary Examiner*—Lucille M. Phynes
*Attorney, Agent, or Firm*—Michael J. Murphy

[57] ABSTRACT

A catalyzed process for the preparation of monomeric and/or polymeric compounds such as esters, polyesters, ester-amides, and polyester-polyamides which result from the reaction of an imide and an alcohol in the presence of a Group IA, IIA, IIB and/or IIIA metal or metal compound, imide-alcohol condensation catalyst.

24 Claims, No Drawings

CATALYTIC PROCESS FOR IMIDE-ALCOHOL CONDENSATION

Matter enclosed in heavy brackets [ ] appears in the original patent but forms no part of this reissue specification; matter printed in italics indicates the additions made by reissue.

BACKGROUND OF THE INVENTION

The invention relates to a catalytic process for the condensation of imides and alcohols. In another aspect the invention relates to a catalytic process for the preparation of monomeric and/or polymeric compounds such as esters, polyesters, esteramide, and polyester-polyamides. Yet in another aspect, the invention relates to the catalyzed imide-alcohol condensation preparation of polymers and copolymers having a variety of molecular weights.

Condensation reactions for imides and alcohols have been taught; however, these known condensation processes are slow and require several hours before reaction completion is approached. Imide-alcohol condensation reactions which produce polymers of lower molecular weight proceed under moderate conditions, but it is much more difficult to prepare polymers of high molecular weight. In the preparation of polymers by imide-alcohol condensation reaction, only polymers of a moderate molecular weight could be achieved unless specific reactants such as polymers having a plurality of hydroxyl and/or amino radicals were used. The latter class of reactant is described in U.S. Pat. No. 2,682,526 to Flory, for the purpose of preparing polymers of high molecular weight by imide-alcohol condensation reactions. The described imide-alcohol condensation reactions were not catalyzed and required reaction periods of several hours and specific reactants in order to achieve high molecular products. In the absence of an imide-alcohol condensation catalyst, the described process lacked sufficient reactive activity to utilize, for example, alcohols or polymers having secondary hydroxyl radical.

It is an object of this invention to provide a rapid, catalyzed process for the condensation of imides and alcohols resulting in the formation of monomeric and/or polymeric compounds such as esters, polyesters, esteramides, and polyester-polyamides. Another object of this invention is to facilitate the preparation of such condensation products in instances where the preparation required forced and strenuous conditions by known means. Yet another object of this invention is to prepare copolymers of varying molecular weights under controlled conditions. Other objects and advantages will appear as the description proceeds.

SUMMARY OF THE INVENTION

If an imide-alcohol condensation process could be found which provided sufficient control of reaction conditions resulting in products of varying molecular weights, it would represent a significant advance in the state of the art. The present invention pertains to catalyzed processes for imidealcohol condensation reactions wherein the alcohol has one or more hydroxyl groups attached to an aliphatic carbon. The invention pertains further to a catalyzed condensation reaction for the preparation of monomeric or polymeric compounds such as esters, polyesters, polyester amides, and polyester polyamides.

DESCRIPTION OF THE PREFERRED EMBODIMENTS

It has now been found that the object of the present invention may be accomplished by catalyzing imide-alcohol condensation reaction with a basic metal or metal compound, imidealcohol condensation catalyst. Generally, the metals of Group IA, IIA and IIB or compounds thereof are suitable catalysts for the imide-alcohol condensation according to the invention. Basic metals of Group IA, IIA, IIB and IIIA are effective either in metallic form or in the form of hydrides, halohydrides, alkyl halides, oxides, hydroxides, peroxides, carbonates and the like. Other suitable catalyst can be formed from a number of organo-metallic compounds of these metals such as metal alkyls, metal phenols, metal amide, alkoxides, glycoxides and the like. Examples include sodium hydride, potasium hydroxide, lithium oxide, ethyl magnesium bromide, calcium fluorohydride, strontium carbonate, zinc caprolactam, barium hydroxide, methyl sodium, butyl lithium, potassium phenate, diphenyl barium, sodium amide, magnesium diethyl, isobutyl aluminum dichloride, diisobutyl aluminum chloride, triisobutyl aluminum, diethyl aluminum chloride, triethyl aluminum, diethyl aluminum bromide, and the like. The catalyst can be formed in situ by reaction of one of the foregoing metals [are] *or* metal compounds with the alcohol segment of the imide-alcohol condensation reactants. Catalyst concentrations can range from a fraction of 1 mole percent to fifteen or twenty or more mole percent of the alcohol segment. The term "alcohol segment" as defined for the purposes of this invention means compounds having at least one hydroxyl radical attached to an aliphatic carbon. The polymers which result from the catalyzed imide alcohol condensation reaction according to the invention can be utilized as prepolymers, for example, the polymerization of lactam in the preparation of terpolymers. Catalysts which can be utilized in the imide alcohol condensation reaction in the presence of a lactam reaction media without readily polymerizing the lactam media, include zinc caprolactam, calcium caprolactam, barium caprolactam, aluminum tricaprolactam, dicaprolactam aluminum chloride, caprolactam aluminum chloride, aluminum bis (bromomethyl), and magnesium caprolactam. The alcohol segments according to the invention include simple alcohols and/or polyols, arising from monomeric or polymeric compounds where the hydroxyl radical is attached to the compound through an aliphatic carbon. The alcohol segments can have one or more hydroxyl radicals attached through the aliphatic carbon. Typical alcohols which are operable according to the invention are monohydric aliphatic alcohols, e.g. methanol, ethanol, 1-propanol, 2-propanol, 1-butanol, tertiary butanol, 2-ethylhexanol, 1-dodecanol, 1-octadecanol; unsaturated alcohols, e.g. allyl alcohol and methallyl alcohol, halogenated alcohols, e.g. ethylene chlorohydrin; the nitro alcohols, e.g. 2-nitrobutanol-1; etheralcohols, e.g. ethylene glycol monomethyl ether, and diethylene glycol monoethyl ether; cycloalkanols, e.g. cyclohexanol, aralkyl alcohols, e.g. benzyl alcohol, tertiary-amino alcohols, e.g. triathanolamine, the cycloalcohols, e.g. beta-cyanoethanol; the polyhydric alcohols, e.g. ethylene glycol, the polyethylene glycols, polymeric alcohols which have been formed by oxidizing and then partially reducing isoolefin; conjugated diolefin copolymers, alkyl resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides; triglycerides containing one or more alcoholic hydroxyl groups, e.g. castor oil and "blown" oils made from oils such as soya and linseed oils; methanol phenols, e.g. 2,6-dimethylol 4-alkyl-phenols and their condensation polymers, N-methylol compounds, e.g. N-methylolmaleimide and N,N'-dimethylolurea; and alcohols containing sulfone groups, e.g. those alcohols made from a glycol and divinyl sulfone.

Available commercial polyols which are suitable reactants according to the inventive process are produced by reacting, for example, propylene oxide or ethylene oxide with glycols, glycerol, pentaerythritol, glucose, amines, and the like. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentanediol, butylene glycol, 1,4-butanediol, dicylclopentadiene glycol, heptaethylene glycol, and isopropylidene bis (phenyleneoxypropanol-2); diols other than alkylene glycols such as hydroxyethyl acrylate and hydroxypropyl methacrylate; polyols having more than two hydroxy functions such as glycerol, pentaerythritol, 1,2-hexanetriol, and 1-trimethylol propane; polymeric polyols such as polyethylene glycol, polypropylene glycols, polyoxypropylene diols and triols, castor oils, polybutadiene glycols and polyester glycols. In addition to all the hydroxy compounds set forth above the thio compounds analogous to the above compounds having sulfur atoms in place of oxygen are also included within the scope of the invention. A few examples include hydroxyethyl thioglycolate, ethylene glycol bis (thioglycolate), pentaerythritol, tetrakis (thioglycolate) and thiodiglycol.

If the polyol intermediate is a polymer, the molecular weight of the polyol can be any amount. Commercially available polyol compounds have molecular weights from 200 to 5000, but polymers with molecular weights outside that range can also be useful in the practice of the instant invention. If the polyol intermediate is a single molecule having two hydroxyl radicals such as ethylene glycol, a suitable polyol according to the invention would have a molecular weight of at least 62; however, simple methyl alcohol having a molecular weight of 32 is also suitable according to the invention.

Various imides will work according to the catalyzed imide alcohol condensation process of the invention; however, acyl lactams, acyl polylactams, and polyacyl lactams are the preferred imides and for the purposes of this disclosure will be referred to as acyl lactams. Typical polymers are produced according to the catalyzed imide alcohol condensation reaction wherein the polyacyl lactam constituent is reacted with a polyol constituent. In the formula set forth below for the polyacyl lactam useful herein, the R group can be any hydrocarbon group having the necessary number of available valances to bond itself to all of the acyl groups included in the compound. The hydrocarbon group can be of any size but preferably contains a maximum of 8 to 10 carbon atoms. Examples of suitable R groups include phenylene, biphenylene, methylene, hexylene, polyoxyethylene, polyoxypropylene, and analogous hydrocarbons having more than two sites available for bonding to acyl groups. The A and A' groups can be carbonyl, thiocarbonyl, sulfuryl, phosphoryl. The Y group can represent any alkylene chain having from 3 to 14 or more carbon atoms, preferably from about 3 to about 10 carbon atoms. Preferred among the class of polyacyl lactams included within the scope of the formula given below are those where the A and A' are carbonyl groups. Particularly preferred are those compounds where A and A' are carbonyl, where R is either alkylene or phenylene, Y is a five membered alkylene group and the integer a is 1. Suitable polyacyl lactams which can comprise the imide segment of the imide alcohol condensation reaction are represented by the formula.

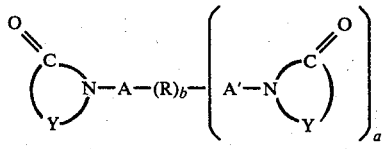

where A and A' are acyl groups selected from

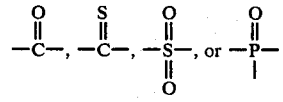

where Y is an alkylene group having at least about 3 carbon atoms, where R is a divalent or polyvalent group, where a is an integer equal to at least one, and b is an integer. Examples include terephthaloyl bis-caprolactam, i.e.

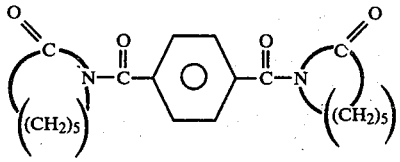

oxalyl bis-caprolactam; isophthaloyl bis-caprolactam; adipoyl bis-caprolactam; malonyl bis-pyrrolidinone, succinoyl bispyrrolidinone, glutaroyl bis-piperidone; glutaconoyl bispiperidone; 2-ethyl-2-phenyl-glutaroyl bis-valerolactam; 2,3-diethylsuccinoyl bis-caprolactam; pimeloyl bis-capryllactam; sebacyl bis-caprolactam, phthaloyl bis-piperidone, isophthaloyl bis-dodecanolactam; trimesoyl-tris-caprolactam: 1,2,3,5-benzenetetracarbonyltetrakis-caprolactam; 1,2,3,4-napthalene-tetracarbonyl-tetrakispiperidone and 1,4-cyclohexanedicarbonyl bis-caprolactam; 1,3-benzene disulfonyl caprolactam; 3-(sulfonyl caprolactam) benzoyl caprolactam; phosphoryl tris-caprolactam; benzene phosphoryl bis-caprolactam; and dithioterephthaloyl bis-caprolactam.

A typical catalyzed imide-alcohol condensation reaction according to the invention is represented by the schematic formulations:

(B) HO θθθ OH +

-continued

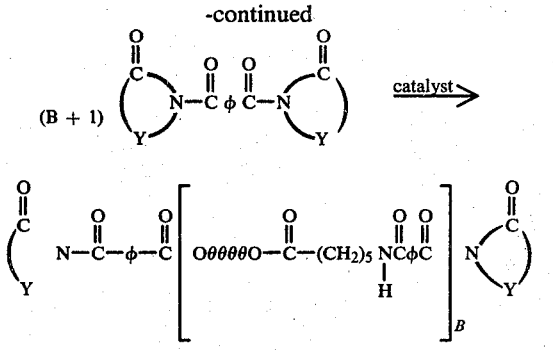

wherein Y is an alkylene group having at least about 3 carbon atoms, [0] $\phi$ is an aromatic segment, and B is an integer equal to one or more. Preferred catalyst can be selected from the Group IA, IIA, IIB, and IIIA metal compounds such as lactam salts, halo-lactam salts and alkoxides, for example, caprolactam magnesium bromide, bromomagnesium caprolactam, sodium caprolactam, calcium caprolactam, zinc caprolactam, aluminum tri-caprolactam, aluminum bis(bromomethyl), caprolactam aluminum chloride, dicaprolactam aluminum chloride and the like.

The amount of acyl lactam useful for the preparation of the copolymers according to the invention depends upon the quantity of alcohol or polyol being used. For preferred polymerization, it is desireable that the acyl lactam be present in an amount from about 10 to about 200 mole percent of the alcohol or polyol. Preferred ratios of the two polymer forming materials i.e. imide-alcohol depend upon the end use to applications of the finished polymers. For end use applications requiring elastomeric properties such as elongation, the relative proportions of the two monomers can be arranged so that the polymerizable medium will contain 60 or 80 or 90 percent or more of the polyol compound. Polymers containing about equal quantities of both acyl lactam and polyol are preferred for a great many uses because of the advantageous combination of properties achieved by such polymers.

Other end product considerations can be made in selecting the reagents according to the catalyzed imide-alcohol condensation reaction such as selecting a polyacyl lactam with an aromatic hydrocarbon group between the acyl lactam groups as opposed to a long chain aliphatic group. The selection of the aromatic group will result in a more rigid product. Similarly the copolymers can be highly crosslinked through the use of polyols having more than two hydroxyl groups. With all the foregoing techniques available for modifying and adjusting the properties of the polymers produced by the invention, it can be appreciated that the polymers can be used in a number of end use applications. It is contemplated that the copolymers produced by this invention will be particularly useful in a number of textile and other applications. Textile applications for the copolymers include the use in the manufacture of non-woven fabrics and high moisture regain fibers. The copolymers produced according to the inventive process can also be manufactured as foam articles. The copolymers can also be produced in the form of molding resins which can subsequently be molded by injection molding, extruding, thermoforming and other techniques to produce products of virtually any shape. The highly elastomeric copolymers can also be used in the manufacture of automobile tires and tire components. The polymers can be modified with fillers, fibers, pigments, dyes, stabilizers, plasticizers, flame retardants and other polymeric modifiers to alter their properties and thereby enlarge even further the scope of applicability. One such modification comprises reinforcing the polymers with fillers or fibers which have been treated with coupling agents capable of increasing the bonding of the fillers or fibers to the polymer molecules. A large number of organosilane compounds have been found to be especially capable of performing this task of improving adhesion between polymer and filler or fiber. Examples of some suitable organosilane couplers for use with the polymers produced according to the invention include 3-aminopropyl triethoxysilane, glycidoxypropyl, trimethoxysilane and N-trimethoxysilylpropyl-N-a-aminoethyl-amine. Preferred fillers and fibers include quartz, wollastonite, feldspar, calcined kaolin clay, glass fibers and other high performance fibers such as graphite, boron, steel and the like. The concentrations of fillers and fibers can vary from very small amounts such as 1 or 2 volume percent up to seventy or eighty percent by volume or more.

The catalyzed [amide-alcohol] *imide-alcohol* condensation processes according to the invention utilize temperatures varying from about −20° C. to about 230° C. or more depending upon the particular ingredients being used. Preferred polymerization temperatures range from about 20° to about 180° C. Catalyzed imide-alcohol condensation process reaction periods vary depending upon the condensation temperatures and the specific ingredients used in the polymerization system. Total polymerization time can be as little as 0.5 seconds and can range preferably from a few seconds to a few minutes, for example from about 0.5 seconds up to about 1 hour. The periods of reaction can be extended to any duration up to several hours or more; however, the catalyzed imide-alcohol condensation reaction can generally be completed in a matter of minutes. It is preferable to use substantially anhydrous reagents and solvents in the catalyzed imide-alcohol condensation reaction. It is also preferable to use an inert atmosphere such as nitrogen in order to achieve an anhydrous atmosphere. The catalyzed imide-alcohol condensation reaction occurs under atmospheric pressure; however, various pressures can be utilized when higher temperatures will require liquification pressures for the reactants.

The following Examples 1 through 11 demonstrate the operability of the inventive process wherein various catalysts, reactants and imide-alcohol condensation conditions are employed. Example 1 illustrates the catalyzed reaction of a simple monohydric alcohol i.e. ethanol and acyl lactam. Example 2 illustrates the catalyzed reaction of ethylene glycol with acyl lactam. Examples 3 through 6 illustrate the preparation of intermediate polymers suitable for the formation of other polymers, for example, terpolymers with lactams. Example 7 illustrates the preparation of a water soluble film while Examples 8 and 9 illustrate the preparation of cross-linked elastomers. Example 10 illustrates the use of a Group IIIA metal compound catalyst. Example 11 illustrates the use of a Group IA metal compound catalyst. Examples 1 through 11 demonstrate varied reactants, catalysts, conditions, and resulting products of the inventive imide-alcohol condensation reaction; however, the invention is broader in scope than the limited teachings of the following examples and should not be considered so limited.

EXAMPLE 1

To a 1 liter flask equipped with stirrer, nitrogen inlet tube and reflux condenser fitted with a liquid reservoir trap were charged 35.6 gms. isophthaloyl-bis-caprolactam and 400 ml toluene. The mixture was dried by refluxing toluene until no further water collected in the trap. The resulting solution was cooled under nitrogen to 80° C. Ethyl alcohol (14.1 gm) was added and the solution heated to gentle reflux. To the refluxing solution was added 1.5 ml of ethyl magnesium bromide (3 molar in diethyl ether) and the mixture refluxed an additional 15 minutes. The solution was cooled and stirred with 400 ml 10% hydrochloric acid solution. The toluene solution was separated from the aqueous solution and dried by refluxing and trapping the azeotroped water. The toluene was removed by distillation and the residual liquid distilled under 0.1 mm vacuum. Three products were obtained:

| | Boiling Point | Wt-Grams |
|---|---|---|
| Fraction 1 | 85°–120° C. | 6.60 |
| Fraction 2 | 162–205 | 10.55 |
| Fraction 3 | Residue | 11.70 |

Product Identification

Fraction 1
Diethyl Isophthalate

| Wet Analysis | % Carbon | % Hydrogen | % Nitrogen |
|---|---|---|---|
| Theory | 64.85 | 6.35 | 0 |
| Found | 64.67 | 6.41 | 0.39 |
| | 64.63 | 6.35 | 0.40 |

Fraction 2-
m-Carbethoxy[N-(5-carbethoxy-n-amyl)]benzamide

| Wet Analysis | % Carbon | % Hydrogen | % Nitrogen |
|---|---|---|---|
| Theory | 64.46 | 7.51 | 4.18 |
| Found | 64.62 | 7.69 | 4.21 |
| | 64.75 | 7.62 | 4.16 |

Fraction 3-
Residue N,N'-Bis(5-carbethoxy-n-amyl)isophthalamide

| Wet Analysis | % Carbon | % Hydrogen | % Nitrogen |
|---|---|---|---|
| Theory | 64.26 | 8.09 | 6.24 |
| Found | 64.43 | 8.17 | 5.92 |
| | 64.26 | 8.24 | 6.01 |

Fraction 1 product represents the results of the alcohol reacting with both the phthalic carbonyls with caprolactam being split out. Fraction 2 product results from one alcohol moiety reacting at a lactam carbonyl, resulting in ring opening while a second alcohol moiety reacts at the phthalic carbonyl of the remaining imide groups, splitting off caprolactam. The Fraction 3 residue results from the alcohol reacting at both lactam carbonyls and opening the rings.

EXAMPLE 2

A mixture of 3.1 g (0.05 moles) ethylene glycol and 8.9 g (0.025 moles) isophthaloyl bis-caprolactam were heated under nitrogen to 120° C. To the resulting solution was added 1.5 ml ethyl magnesium bromide (3 molar in diethyl ether) with vigorous stirring. The reaction temperature rose rapidly to 180° C. as a result of the heat of reaction and the mixture was cooled to 50° C. in 1 minute. After further cooling to room temperature the mixture was evacuated to remove ether and evolved ethane from the catalyst. To facilitate de-gassing, the mixture was warmed to 50° C. under vaccum. The resulting product was a viscous oil.

Analysis–5.65% Nitrogen (theory 5.83%)

Chromatographic analysis of the product showed 33.6% free caprolactam in the mixture. The free caprolactam isolated indicates that alcohol reaction occurred at the phthaloyl carbonyl to the extent of 75% and at the lactam carbonyl 25%.

EXAMPLE 3

A mixture of 150 gm Voranol P-2000 (polyoxypropylene glycol), 29.4 gm isophthaloyl bis-caprolactam, 146 gm caprolactam and 1.5 g Santowhite Powder were heated under vacuum to distil 25 ml caprolactam. The solution temperature was adjusted to 125° C. and stirred under nitrogen and 0.37 ml magnesium dicaprolactam (2 molar in 1-methyl-2-pyrrolidone) added. The catalyzed mixture was stirred at 125° C. for 45 minutes and 0.3 gm lauric acid added to deactivate the catalyst. The polymer solution thus formed in caprolactam may be further catalyzed with Grignard or alkali metal lactam to form a 50% polypropylene glycol/nylon 6 terpolymer.

EXAMPLE 4

A mixture of 195 gm Voranol P-2000 (polyoxypropylene glycol), 93 gm caprolactam, 37.1 gm isophthaloyl bis-caprolactam and 0.6 gm Flectol H were heated under vacuum to distil 25 ml caprolactam. The mixture was cooled to 65° under nitrogen and 2.4 ml of magnesium dicaprolactam (2 molar in 1-methyl-2-pyrrolidone) was added. A viscosity increase occurred within 10 seconds with an exotherm to 77° C. The polymer solution was stirred at 70° C. for one hour under vacuum and then 0.58 ml glacial acid added to de-activate the catalyst. The polymer solution had a viscosity (Brookfield RVF) of 31,400 cps at 100° C. and 7,300 cps at 160° C. The solution thus formed in caprolactam may be further catalyzed with alkali metal or Grignard catalyst to form a 65% polypropylene glycol/nylon 6 terpolymer.

EXAMPLE 5

A mixture of 90 g Carbowax 4000 (polyoxyethylene glycol), 216 g caprolactam, 18.7 g terephthaloyl bis-caprolactam and 0.6 g Flectol H were heated under vacuum to distil 25 ml caprolactam. The mixture was cooled to 75° C. under nitrogen and 1.3 ml magnesium dicaprolactam (2 molar in 1-methyl-2-pyrrolidone) added. Viscosity increase due to polymer formation appeared to be complete in 1 minute. The solution was stirred an additional hour under vacuum to insure complete reaction and then 0.17 ml glacial acetic acid added to de-activate the catalyst. The polymer solution thus formed in caprolactam may be further catalyzed to form a 30% polyethylene glycol/nylon 6 terpolymer.

EXAMPLE 6

A solution of 227.5 gm Voranol P-4000 (polyoxypropylene glycol), 23.1 gm terephthaloyl bis-caprolactam and 1 gm Flectol H in 300 ml toluene was dried by refluxing to azeotrope water. The solution was catalyzed by the addition of 0.2 molar ethyl magnesium bromide in toluene/diethyl ether. A discernible viscosity increase occurred over a 15 minute period. After an additional 15 minutes reflux time, 0.4 gm lauric acid was added to deactivate the catalyst. The resulting polymer may be isolated by solvent removal through distillation and can be used in subsequent copolymerization reaction with caprolactam by use of Grignard or alkali metal lactams.

EXAMPLE 7

A mixture of 33.6 gm terephthaloyl bis-caprolactam, 141.6 gm Carbowax 4000 (polyoxyethylene glycol) and 0.6 gm Irganox 1010 were heated under vacuum at 170° C. for 45 minutes. The mixture was cooled to 100° C. and an additional charge of 141.5 gm Carbowax added. The mixture was evacuated and heated an additional 15 minutes at 120° C. The mixture was cast into a $\frac{1}{8}\times10\times10$ inch vertical mold which had been heated at 120° C. Casting was accomplished by means of a metering pump. The mixture was catalyzed by injecting bromomagnesium pyrrolidone (2 molar in 1-methyl-2-pyrrolidone) into the stream by means of a second metering pump. Catalyst concentration was 7.8 mole percent based on terephthaloyl bis caprolactam. After casting, the mold was heated to 160° C. in 15 minutes and held at that temperature for 75 minutes, after which the mold was cooled and the polymer sample removed.

Tensile specimens were cut from the cast sheet, and part of the remaining polymer was fabricated into a film by compression molding at 100° C. Micro tensile specimens were cut from the film for tests. Both forms of the copolymer were water soluble. Tensile properties of the copolymer are reported in the following table.

Table 1

| | Yield | | Break | | Modulus |
|---|---|---|---|---|---|
| | Strength PSI | % Elongation | Stength PSI | % Elongation | PSI |
| Cast Sheet | 1380 | 16 | 1730 | 600 | 41,200 |
| Pressed Film | 1350 | 10 | 4450 | 1115 | |

EXAMPLE 8

A mixture of 36.72 gms isophthaloyl bis-caprolactam and 50.0 gm. Polymeg 1000 (polytetramethylene glycol having hydroxy number of 113.5) was stirred under vacuum at 150° C. for 30 minutes and then cooled to room temperature. To this mixture was added 39.4 gm Polymeg 2000 (hydroxyl number=57.6) and 61.51 gm Niax 61-58 (multifunctional polyoxy propylene polyol with hydroxyl number=55.7) and the ingredients thoroughly mixed. To the resulting solution was added 5 ml bromomagnesium pyrrolidone (2 molar in 1-methyl-2-pyrrolidone) and the catalyzed mixture stirred under vacuum for 1 minute. The solution was poured into a bottle. The mixture gelled in 30 minutes. After curing overnight at room temperature a crosslinked elastomeric polymer was formed having a Shore A hardness of 43.

EXAMPLE 9

A mixture of 36.72 gms isophthaloyl bis-caprolactam and 50.0 g Polymeg 1000 (Polytetramethylene glycol having hydroxyl number 113.5) were heated under vacuum at 130° C. for 60 minutes and then cooled to room temperature. To this mixture was added 41.83 gms Pluracol P-2010 (polyoxypropylene glycol with hydroxyl number=54.3) and 60.14 gms Pluracol GP-3030 (polyoxypropylene triol with hydroxyl number=56.6). To the resulting solution was added 2.5 ml bromomagnesium pyrrolidone (2 molar in 1-methyl-2-pyrrolidone) and stirred under vacuum. The catalyzed mixture was poured into a bottle and cured by heating in a 100° C. oven for 1 hour. The resulting elastomer had a Shore A hardness of 33.

The above run was repeated except that the mixture was cured at room temperature for 18 hours to yield an elastomer of Shore A hardness 39.

EXAMPLE 10

A mixture of 71 gms caprolactam, 14.0 gms isophthaloyl bis-caprolactam and 75 gms Voranol P-2000 (polyoxypropylene glycol) was heated under vacuum to distil 10 ml caprolactam. The resulting solution was cooled to 100° C. under nitrogen and catalyzed by adding 0.5 ml diisobutyl aluminum chloride. The course of the bis imide-glycol reaction was followed by viscosity measurement at 100° C. using a Brookfield RVF viscometer. In 30 minutes viscosity increased to 54,000 cps, at 1 hour 450,000 cps and at 2 hours 1,100,000 cps. After 2 hours, viscosity remained steady. The resulting polymer solution can be used to prepare a 50% PPG/nylon 6 terpolymer by further catalysis with Grignard or alkali metal catalysts.

EXAMPLE 11

A solution of sodium glycolate catalyst was prepared by mixing 5 g Pluracol GP 3030 (polyoxypropylene triol) with 0.06 g sodium hydride (60% in mineral oil) and heating under vacuum to remove hydrogen.

A second solution of 2.7 g terphtholoyl bis-caprolactam in 10 g Pluracol P-2010 (polyoxypropylene Glycol) was prepared by heating to 190° C.

The two solutions were mixed together at 190° C. to given an unstirrable rubbery gum within 5 seconds. The resulting resin was soft and tacky because of incomplete mixing due to the high reactivity of the system.

What we claim is:

1. A catalyzed imide-alcohol condensation process for the preparation of polymeric compounds of polyester-polyamide comprising: [contacting] *polymerizing* alcohols having one or more hydroxyl groups attached to an aliphatic carbon, and acyl lactams *having from 4 to 11 carbon atoms in each lactam ring,* in the presence of at least one of a Group IA, IIA, IIB, and IIIA metal or metal compound *to form said polymeric compounds of polyester-polyamide.*

2. A process according to claim 1 wherein the metal compound is comprised of at least one of a lactam salt, a halolactam salt, and an alkoxide.

3. A process according to claim 1 wherein the metal is selected from the group consisting of sodium, potasium, lithium, magnesium, calcium, strontium, barium, zinc, cadium, and aluminum.

4. A process according to claim 1 wherein the catalyzed imide-alcohol condensation occurs at a temperature of from about −20° C. to about 230° C.

5. A process according to claim 1 wherein the acyl lactam is present in an amount of from 10 to about 200 mole percent of the alcohol.

6. A process according to claim 1 wherein the catalyzed imide-alcohol condensation occurs in a lactam reaction media and the catalysts are selected from the group consisting of zinc caprolactam, magnesium caprolactam, calcium caprolactam, [aluminum bis (bromomethyl),] caprolactam aluminum chloride, dicaprolactam aluminum chloride, aluminum tri-caprolactam, and bromomagnesium caprolactam.

7. A process according to claim 1 wherein the acyl lactam is comprised of isophthaloyl bis-caprolactam and the alcohol is comprised of a polymeric polyol.

8. A process according to claim 1 wherein the acyl lactam is comprised of terephthaloyl bis-caprolactam and the alcohol is comprised of a polymeric polyol.

9. A process according to claim 7 wherein the catalyst is bromomagnesium caprolactam.

10. A process according to claim 8 wherein the catalyst is bromomagnesium caprolactam.

11. A process according to claim 7 wherein the catalyst is magnesium dicaprolactam.

12. A process according to claim 8 wherein the catalyst is magnesium dicaprolactam.

*13. A process according to claim 6 wherein the imide-alcohol condensation in the lactam reaction media occurs in the absence of any significant polymerization of the lactam reaction media.*

*14. A process according to claim 6 wherein the lactam reaction media comprises caprolactam.*

*15. A process according to claim 6 wherein the catalyzed condensation occurs at a temperature no greater than about 100° C.*

*16. A process according to claim 6 wherein the imide-alcohol condensation product in the lactam reaction media is further catalyzed with catalysts selected from the group consisting of Grignard and alkali metal lactams to form a polyol/nylon block terpolymer.*

*17. A process according to claim 16 wherein the polyol content of the polyol/nylon block terpolymer is between about 30 to about 65 percent.*

*18. A process according to claim 16 wherein said further catalysis occurs at temperatures between about 100° C. to about 180° C.*

*19. A process according to claim 16 wherein before said further catalysis the catalyst of the prior condensation process is deactivated.*

*20. A process according to claim 1 wherein the acyl lactam is comprised of adipoyl bis-caprolactam and the alcohol is comprised of a polymeric polyol.*

*21. A process according to claim 20 wherein the polymeric polyol is selected from the group consisting of polyoxypropylene glycol and polyoxypropylene triol.*

*22. A process according to claims 1, 2, 3, 4, 5, 6, 7, 8, 9, 10, 11, 12, 13, 14, ,15, 20, or 21 wherein total polymerization time is from about 0.5 second to about 1 hour.*

*23. A process according to claims 1, 2, 3, 4, 5, 6, 7, 8, 9, 10, 11, 12, 13, 14, 15, 16, 17, 18, 19, 20, 21 or 22 wherein fillers or fibers are present during the condensation process to reinforce the polymeric compound formed.*

*24. A process according to claim 1 wherein the condensation occurs by polyol reacting at both the lactam carbonyl and the acyl carbonyl of the acyl lactam.*

* * * * *